(12) United States Patent
Kim

(10) Patent No.: US 6,172,971 B1
(45) Date of Patent: Jan. 9, 2001

(54) METHOD FOR FORMING FRAME STRUCTURE FOR USE IN TIME DIVISION MULTIPLE ACCESS COMMUNICATION SYSTEM

(75) Inventor: Byung-Chul Kim, Seongnam (KR)

(73) Assignee: Samsung Electronics Co., Ltd.

( * ) Notice: Under 35 U.S.C. 154(b), the term of this patent shall be extended for 0 days.

(21) Appl. No.: 08/939,211

(22) Filed: Sep. 29, 1997

(30) Foreign Application Priority Data

Mar. 31, 1997 (KR) .................................................. 97-11666

(51) Int. Cl.[7] .................................................. H04B 7/212
(52) U.S. Cl. ........................... 370/348; 370/444; 370/459
(58) Field of Search .................................... 370/280, 294, 370/337, 347, 348, 352, 642, 443, 444, 458, 459

(56) References Cited

U.S. PATENT DOCUMENTS

| | | | |
|---|---|---|---|
| 5,299,198 | * 3/1994 | Kay et al. | 370/347 |
| 5,377,192 | * 12/1994 | Goodings et al. | 370/347 |
| 5,521,925 | * 5/1996 | Merakos et al. | 370/347 |
| 5,729,534 | * 3/1998 | Jokinen et al. | 370/280 |
| 5,732,073 | * 3/1998 | Kusaki et al. | 370/280 |
| 5,881,061 | * 3/1999 | Lizuka et al. | 370/337 |

OTHER PUBLICATIONS

Byung–Chul Kim, An Efficient Wireless Voice/Data Integrated Access Algorithm in Noisy Channel Environments, IEICE Transactions on Communications, vol. E79–B, No. 9, Sep. 1996.

Raychaudhuri D., et al., Multimedia Transport in Next–Generation Personal Communication Networks, IEEE, Feb., 1993, pp. 858–862.

Wilson, N.D., et al., Packet CDMA Versus Dynamic TDMA for Multiple Access in an Integrated Voice/Data PCN, IEEE, vol. 11, No. 6, Aug. 1993, pp. 870–884.

* cited by examiner

Primary Examiner—Alpus H. Hsu
(74) Attorney, Agent, or Firm—Dilworth & Barrese, LLP

(57) ABSTRACT

A frame structure suitable for effectively transmitting voice and data in a TDMA communication system. The TDMA communication system using the frame structure separates voice/data competition procedures, and disposes a request subslot at a leading end of every slot so as to reduce the access delay of a real-time traffic. Thus, it is possible to easily reserve the traffics, by maintaining the constant number of the request subslots. Further, the slots are first allocated to the real-time traffic, and the remaining idle slots are allocated to the non real-time traffic. Therefore, it is possible to give a priority order to a voice user and separate the voice/data contentions.

10 Claims, 8 Drawing Sheets

| SLOT NO. | TERMINAL ID |
|---|---|
| 1 | TID(a) |
| 2 | IDLE |
| ⋮ | ⋮ |
| N-1 | TID(i) |
| N | TID(k) |

FIG. 3A

| BUFFER POSITION | TERMINAL ID | REQUEST SLOT |
|---|---|---|
| 1 | TID(i) | L-2 |
| 2 | TID(m) | L |
| ⋮ | ⋮ | ⋮ |
| U-1 | EMPTY | . |
| U | EMPTY | . |

FIG. 3B

METHOD FOR FORMING FRAME STRUCTURE FOR USE IN TIME DIVISION MULTIPLE ACCESS COMMUNICATION SYSTEM

BACKGROUND OF THE INVENTION

1. Field of the Invention

The present invention relates to a time division multiple access (TDMA) communication system, and more particularly to a method for forming a frame structure which is suitable for effectively transmitting voice and data.

2. Description of the Related Art

With the development of the modern information society, the demand for mobile telecommunications is increasing rapidly. In particular, arise demands not only for the voice communication, but also for the non-voice communication services such as data, facsimile, and video communication based on ISDN (Integrated Services Digital Network). In general, in order to increase the capacity for accommodating subscribers, the mobile telecommunication employs a digital cellular mobile telecommunication system, which has a high frequency recycling efficiency and provides an effective non-voice service. The digital cellular mobile telecommunication system has different a system capacity, operating methods, and facility of realizing the system, according to the multiple access technique.

The multiple access allows a plurality of users to share limited radio communication channels. Such multiple access is generally divided into a frequency division multiple access (FDMA), a time division multiple access (TDMA), a code division multiple access (CDMA), and a space division multiple access (SDMA). The digital cellular mobile telecommunication system generally employs TDMA and CDMA. The TDMA system used a common frequency band and allows a plurality of users to share a carrier wave, by using time slots of time intervals (a so-called frame) allocated to each of the users. The time intervals allocated to each of the users should not be overlapped.

Recently, a personal communication network, which is an advanced cellular mobile telecommunication network, has been proposed. In order to process traffics having various kinds of service request conditions, such a personal communication network needs to have a radio access structure for effective bandwidth allocation. In view of the flexibility and the statistical multiplexing gain, it is known that to transmit the voice and data by the packet is most advantageous.

FIG. 1 illustrates a frame structure including the voice and data which are packed into a packet by the prior art TDMA cellular mobile telecommunication system. Such a frame structure is disclosed in a paper entitled "Multimedia Transport in Next-Generation Personal Communication Networks", Proc. ICC'93, 1993, pp. 858–862, by D. Raychaudhuri and N. Wilson, and a paper entitled "Packet CDMA versus Dynamic TDMA for Multiple Access in an Integrated Voice/Data PCN" IEEE J. on Select. Areas Commun., Vol. 11, pp. 870–884, 1993, by N. Wilson, R. Ganesh, K. Joseph and D. Raychaudhuri.

The prior art communication systems using the frame structure as shown in FIG. 1 have the following disadvantages.

(1) Hybrid Switching with Movable Boundary

In this communication system, radio access is achieved based on the frame structure as shown in FIG. 1. As illustrated, the frame is divided into a reservation phase and an allocation phase. In operation, a traffic user reserves a right of using the subsequent slots at the short reservation phase. If the user has made the reservation successfully or data to be transmitted will be allocated at the allocation phase. Here, a voice traffic is transmitted by channel switching, and a data traffic is transmitted by packet switching. Further, the number of slots that each traffic can use is dynamically controlled according to a load of the voice, to guarantee a priority order of the voice, as far as possible.

With use of the foregoing communication system, it is possible to give the priority order to the voice user when allocating the channel resources. However, fundamentally, it is not possible to settle a voice/data contention problem. Therefore, in case the number of the data users increases rapidly, it is not possible to prevent a loss of the voice packets, which may be caused in the course of the contention.

(2) Packet Switching with Different Permission Probabilities

In this communication system, empty slots are reserved according to permission probabilities of the respective voice or data subscribers. If the empty slots are reserved successfully, the reserved slots will be used until the transmission is completed, in case of the voice. Here, it may be possible to increase the opportunities for reserving the voice, by getting the permission probability of a first voice packet to be higher than a data value. However, in case the traffic load of data increases, the quality of the voice may decrease drastically because the voice/data contention problem is coincidently settled.

(3) Voice/Data Contention Separated System

In accordance with this system, a resource that the voice traffic has requested is first allocated, and then the remaining resources are allocated to data terminals, thereby guaranteeing a priority order of the voice. This voice/data contention separated system is divided into an ALOHA-reservation type and an R-ALOHA type according to the settlement procedure of the contentions.

3-1) ALOHA-Reservation Type

In this type, the contention settlement procedure is performed at a reservation mini-slot on a beginning part of the frame, and a voice talkspurt is reserved by the frame unit. Further, the data is transferred at an idle slot remaining in the allocation phase after the voice traffic is reserved. With use of this system, it may be possible to settle the contention problem in some degree. However, when a channel error occurs in the course of settling the contentions, one should wait for a long time of one frame for the next reservation. In such a case, there may be a high probability that the packets will not be used due to a time delay restriction of the voice.

3-2) R-ALOHA Type

In this type, it is possible to reserve the voice at currently unused slots. A data user can use the unused slots by way of the contention procedure thereof, only when voice is not used. In such a case, if the number of the voice traffics increases, most of the slots are used up. Thus, it may not be possible to have an opportunity for reserving the slots to transfer the next packet. Accordingly, in case the voice load is relatively large, a time delay in accessing the voice increases. Further, if the voice fails to use slots due to the contention, the slots are wasted undesirably.

SUMMARY OF THE INVENTION

It is therefore an object of the present invention to provide a method for forming a frame structure suitable for effectively transmitting voice and data in a TDMA communication system.

It is another object of the present invention to provide a method for removing a time delay restriction for the voice in a TDMA communication system.

It is still another object of the present invention to provide a method for reducing a time delay in accessing voice in a TDMA communication system.

The present invention separates the voice/data contention procedures, and disposes a request subslot at a leading end of every slot so as to settle the problems raised in the R-ALOHA type, thereby reducing an access delay of a real-time traffic. Thus, it is possible to easily reserve the traffics, by maintaining the constant number of the request subslots. Further, the slots are first allocated to the real-time traffic, and the remaining idle slots are allocated to the non real-time traffic. Therefore, it is possible to give a priority order to a voice user and separate the voice/data contentions.

BRIEF DESCRIPTION OF THE DRAWINGS

The above and other objects, features and advantages of the present invention will become more apparent in the light of the following detailed description of an exemplary embodiment thereof taken with the attached drawings in which:

FIGS. 2a to 2d are diagrams for showing a TDMA frame structure according to an embodiment of the present invention;

FIGS. 3a and 3b are diagrams for respectively showing a time slot table and a global data queue structure according to an embodiment of the present invention;

DETAILED DESCRIPTION OF THE PREFERRED EMBODIMENT

Figure 1:
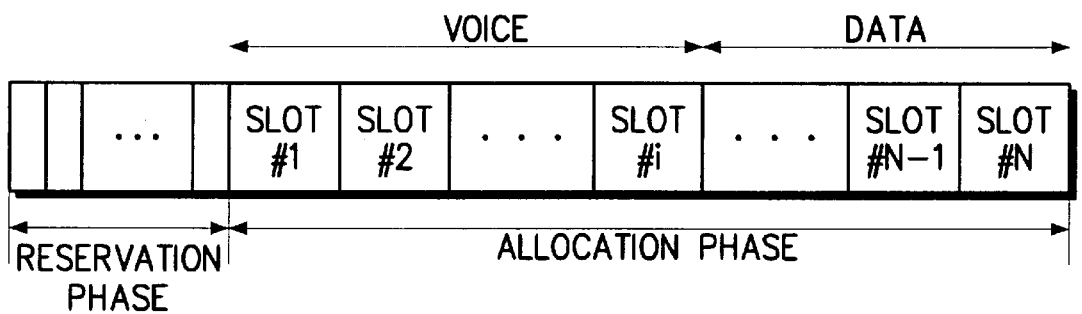
FIG. 1 is a diagram for showing a TDMA frame structure according to the prior art.

A preferred embodiment of the present invention will be described in detail hereinbelow with reference to the attached drawings, in which the like reference numerals represent the like elements. Further, it should be clearly understood that many specifics such as the detailed circuit elements are shown only by way of an example to bring a better understanding of the present invention and the present invention may be embodied without the specifics. Moreover, it should be noted that detailed descriptions on the related prior art may be intentionally omitted if it is believed to be unnecessary in describing the concepts of the present invention. The terms used in the specification are defined in due consideration of the functions of the invention and are replaceable according to a usual practice or an intention of the user or chip designer. Preferably, the terms shall be defined based on the contents described throughout the specification.

Figure 2A:
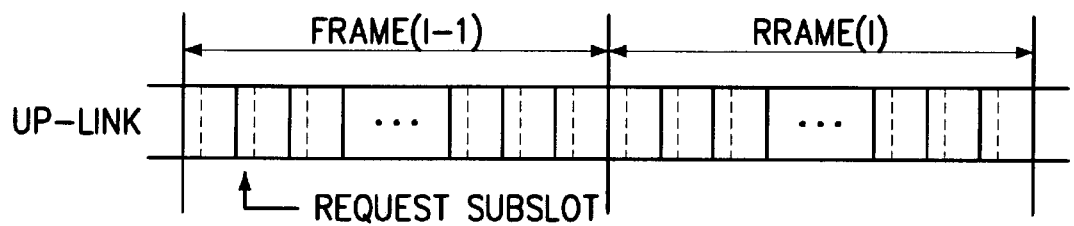
Figure 2B:
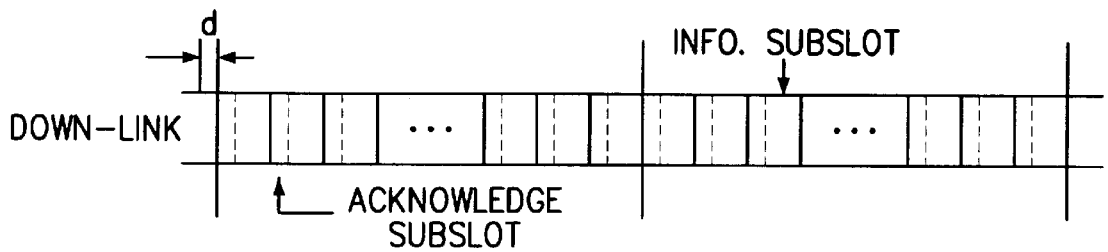

FIGS. 2a to 2d illustrate a frame structure for use in a TDMA communication system according to an embodiment of the present invention. The disclosed frame allows bidirectional communication using two sets of radio frequency bandwidths, i.e., a communication (up-link) from a mobile station to a base station and a communication (down-link) from the base station to the mobile station. More specifically, FIG. 2a illustrates an up-link frame structure for allowing the communication from the mobile station to the base station, and FIG. 2b illustrates a down-link frame structure for allowing the communication from the base station to the mobile station. The respective slots of the frames are composed of request subslots and acknowledge subslots for transferring a request minipacket and an acknowledge minipacket, respectively. Further, the respective slots include information subslots for transferring voice and data.

As illustrated in FIG. 2b, the frame on a down-link channel is delayed by a timing offset $\delta$, compared with the frame on an up-link channel. The timing offset $\delta$ is identical to a half duration of the respective slots. Thus, the base station can manage all the channels competition processes generated in the current up-link slot, and the users can hear the result values of the channel competitions before the next up-link slot begins. Such management is feasible since the propagation delay is negligibly small under a micro cellular environment.

Further, FIGS. 2(c1) and 2(c2) illustrate the request minipacket for the voice and the request minipacket for the real-time data, respectively. FIG. 2d illustrates a structure of the acknowledge minipacket. As illustrated, the request minipacket and the acknowledge minipacket are respectively composed of four different parts according to the traffic types. Specifically, the request minipacket for the voice is composed of the parts Type, TID, RSV, and CRC, and the request minipacket for the real-time data is composed of the parts Type, TID, TSN, and CRC. Further, the acknowledge minipacket is composed of the parts Type, TID, RST, and RSV. The part "Type" of the request minipacket represents the type of the traffic users, and the part "Type" of the acknowledge minipacket is used to notify the allocation status. Here, the value of the allocation status means the type of traffic user permitted to transfer the packet at the subsequent up-link information subslot, as illustrated in the following Table 1.

TABLE 1

| Type | Meaning |
| --- | --- |
| 00 | Voice |
| 01 | Real-time Data |
| 10 | Non Real-time Data |
| 11 | Reserved |

Figure 2D:
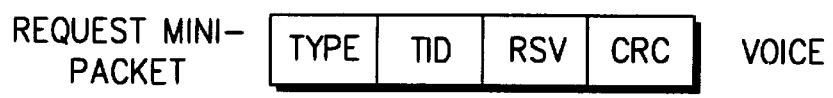
Figure 2D:
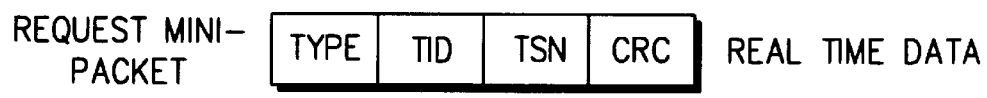
Figure 2D:
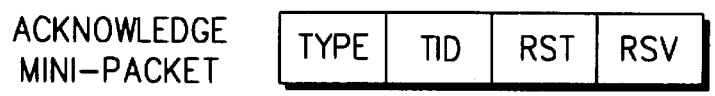

In FIG. 2d, the part "RST" composed of 6 bits includes the detailed results of the channel competition process. The first two bits of the part "RST" represent the channel competition result of the voice terminal, the next two bits represent the channel competition result of the real-time data, and the last two bits represent the channel competition result of the non real-time data. Such resultant values are as shown in the following Table 2.

TABLE 2

| Bit | Results |
| --- | --- |
| 00 | No Contending Terminals |
| 01 | Successful Transmission |
| 10 | A collision |

Further, the part "RSV" is prepared for the subsequent applications, and the part "CRC" is used for detecting the contention or an error caused by the channel noises. The maximum number of the data packets that can be transmitted without further channel competition is limited to eight, in order to impartially distribute the users. The 3-bit "TSN" part represents the number of the time slots required for transmitting the data message. The part "TID" are allocated to the traffic users, when a new terminal is switched-on to setup a call in the base station. The part "TID" is composed of 6 bits. Thus, the maximum number of the traffic users who can communicate simultaneously at each cell is limited to 64.

Figure 4A:
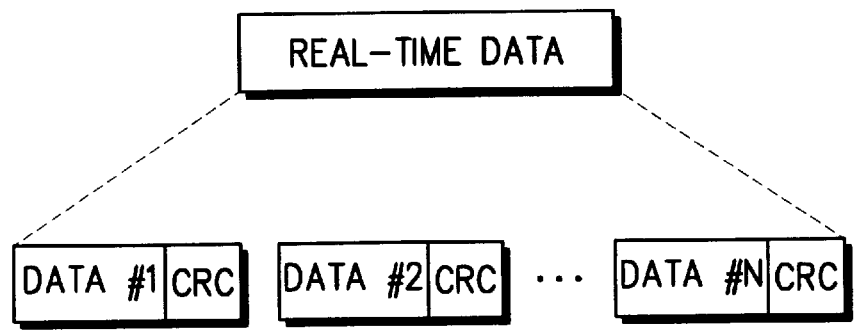
FIGS. 4a and 4b are diagrams for respectively showing data formats for real-time data and non real-time data according to an embodiment of the present invention.
Figure 4B:
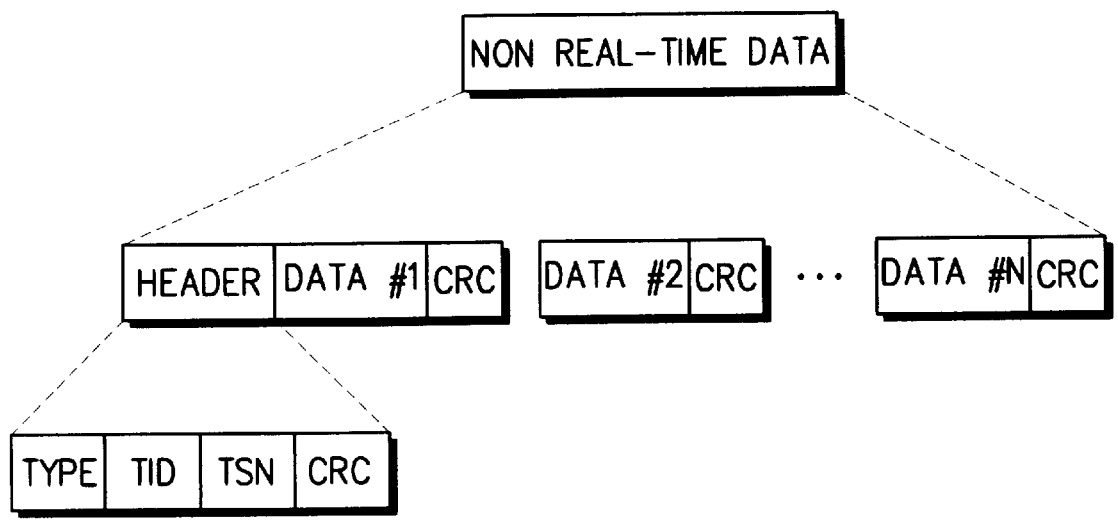

FIG. 3a illustrates a time slot able, and FIG. 3b illustrates a global data queue according to the present invention. Further, FIG. 4a illustrates a data format for the real-time data, and FIG. 4b illustrates a data format for the non real-time data according to the present invention.

Figure 5:
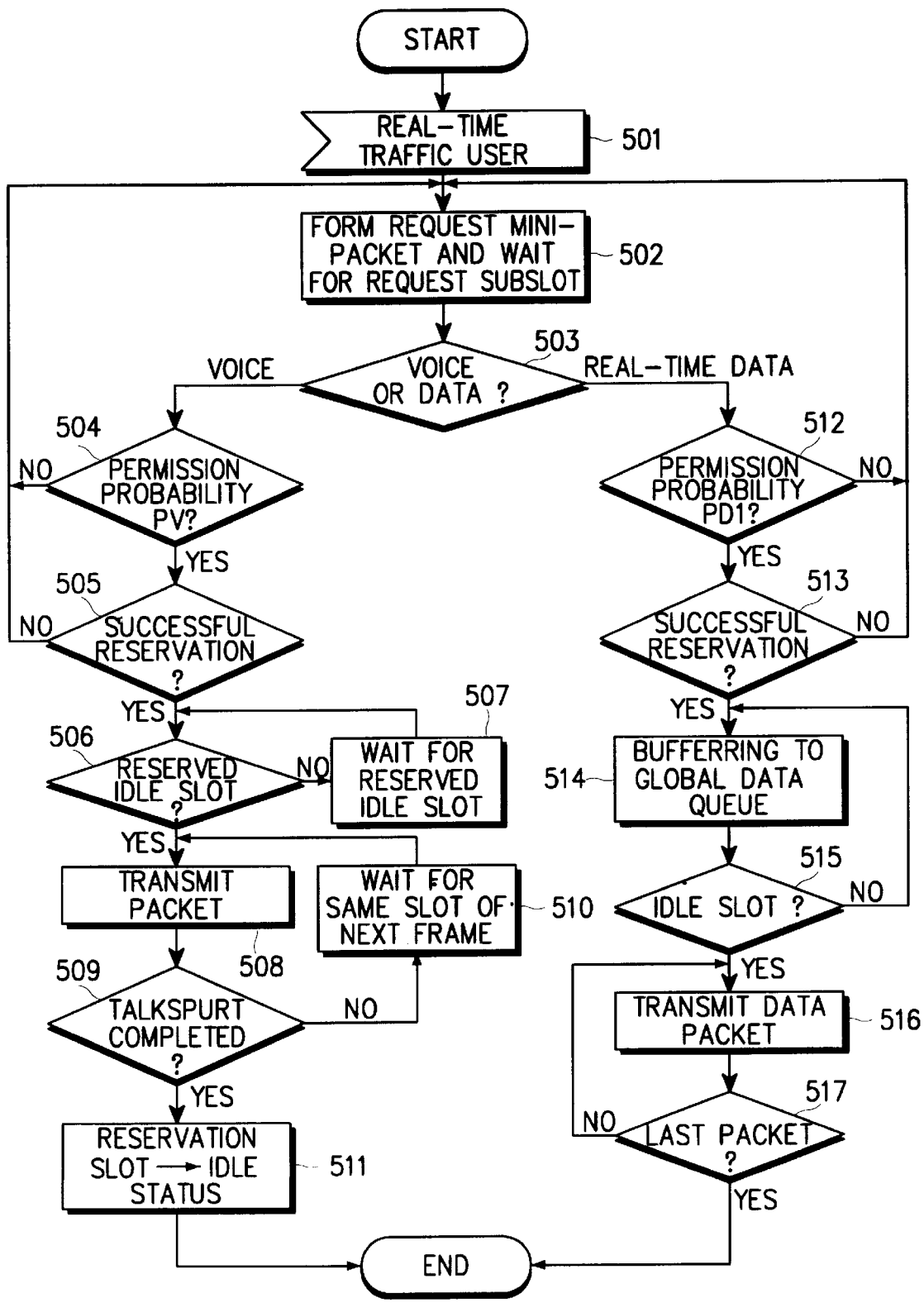
FIG. 5 is a flowchart for processing a real-time data traffic according to an embodiment of the present invention.
Figure 6:
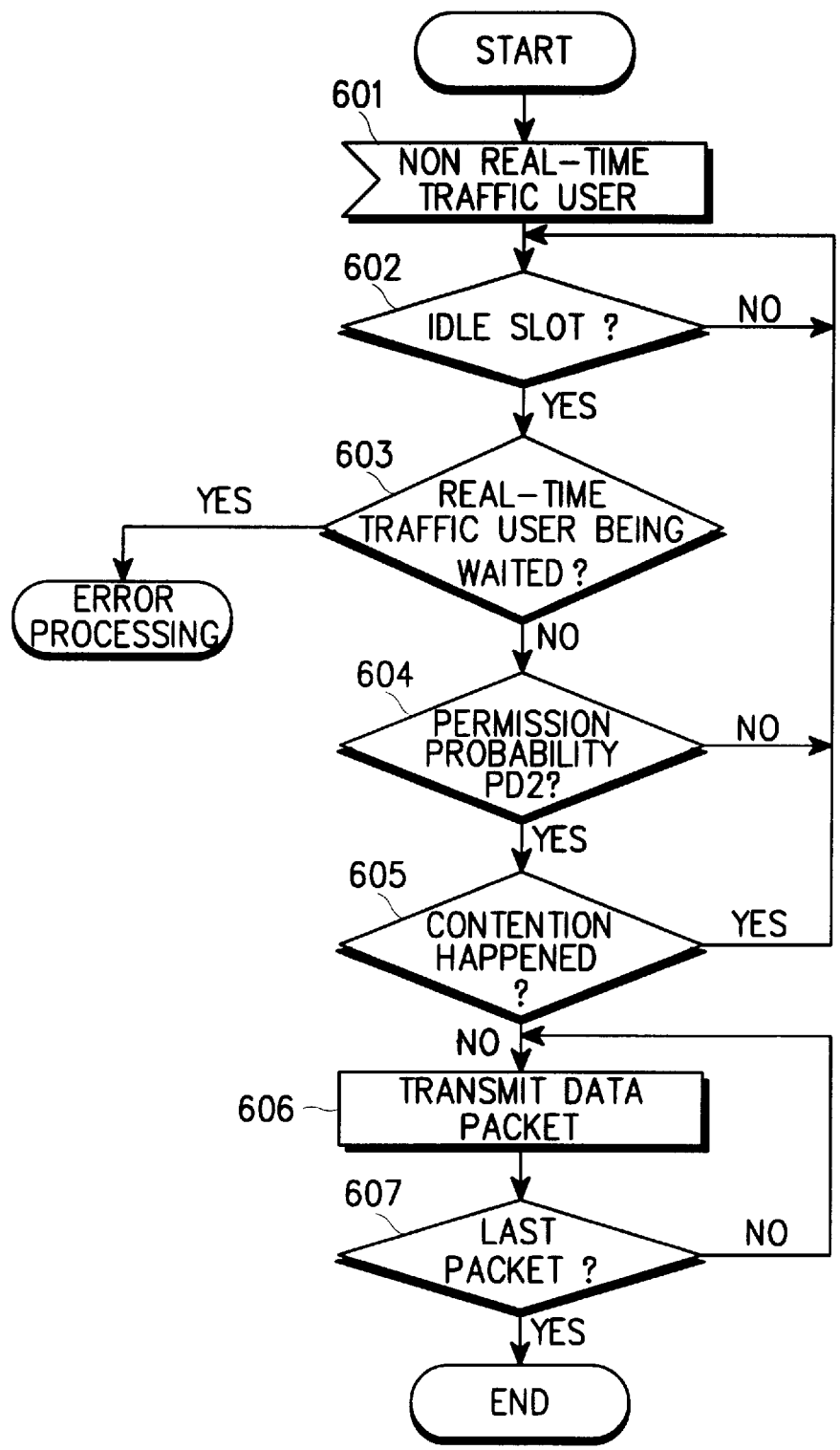
FIG. 6 is a flowchart for processing a non real-time data traffic according to an embodiment of the present invention.

FIG. 5 illustrates a flowchart for processing real-time data traffic according to an embodiment of the present invention, and FIG. 6 illustrates a flowchart for processing non real-time data traffic according to an embodiment of the present invention.

Now, referring to FIGS. 3a, 4a, and 5, the real-time data processing operation will be described hereinbelow. A real-time traffic terminal that generates the new talkspurt or the real-time data message at the current slot transmits the request minipacket with a permission probability Pv or Pd1 at the next request subslot. Here, the value Pv is larger than the value Pd1 (i.e., Pv>Pd1), in order to give the voice users a chance to request more talkspurts. If the base station receives the request minipacket, the real-time traffic terminal checks the "Type" part of the traffic users and the "CRC" part of the request minipacket, to determine whether the contention has happened. If the contention has not happened, the real-time traffic terminal determines user who has the transmitted request minipacket.

The base station looks up the time slot table, shown in FIG. 3a, on which the states of all the up-link information subslots are registered, in order to determine whether the states of all the up-link information subslots are reserved or not. If the time slot table has idle slots, a successful voice terminal is allocated to an idle up-link information subslot which is most adjacent to the current up-link slot. Then, the corresponding slots in the subsequent frames are reserved, until the talkspurt is completed. However, if the time slot table does not have the idle slots, the successful voice terminals are buffered with the voice waiting buffer, while being allocated or until the talkspurt is completed. A buffered voice user is allocated to the idle slots, as soon as the idle slots are provided. If the request minipacket has a type of the real-time data terminal, the request minipacket is registered into the global queue. The real-time data message is divided into a plurality of packets each having a fixed size, as shown in FIG. 4a, prior to being transmitted. Thus, the number of the requested slots is identical to the number of the divided packets.

The base station first looks up the time slot table of FIG. 3a to check whether the next up-link slot is in an idle status or not, prior to transmitting the acknowledge minipacket. If the next up-link slot is a reserved slot, the base station records on the acknowledge minipacket a terminal identification and the traffic type corresponding to the number of the next up-link slots based on the time slot table, and broadcasts the terminal identification and the traffic type. If the next up-link slot is not a reserved slot, the base station allocates the next idle slot to a voice user at a first position of the voice waiting buffer.

However, if the voice waiting buffer has no voice terminal and the next up-link information subslot is the idle slot, the base station allocates the next idle slot to the data packet of the global queue on a first-come-first-served (FCFS) basis, and reduces the number of the packets to be transmitted. The request minipackets of the unsuccessful real-time traffic are retransmitted to the subsequent request subslot.

The results of the channel competition and channel distribution processes are broadcasted to the acknowledge minipacket on the down-link channel after the elapse of the timing offset δ. A user who transmits the request minipacket can realize whether the contention has happened in the course of the channel competition process. The base station informs, a user who made a successful reservation, that the idle slot is allocated at the acknowledge subslot prior to the allocated slot.

Next, referring to FIGS. 3b, 4b and 6, the non real-time data processing operation will be described hereinbelow. In case of the non real-time traffic terminal, it is necessary to wait for an available information subslot, in order to transmit a first packet having a permission probability Pd2. All the users may realize whether the next information subslot on the up-link channel is available or not. The idle slot means that there are no real-time traffic users allocated. Therefore, the non real-time users can transmit the first data packet to the idle slot only. The first packet of the non real-time data message inserts the parts identical to the request minipacket at the beginning of the first data packet, as shown in FIG. 4b, so as to include the terminal identification and the number of the required idle slots.

If the other users do not transmit the data packet to the current idle slot, the non real-time data user may successfully transmit the data packet. The base station reads out the terminal identification and the number of the required idle slots from the "TID" and "TSN" parts of a header of the first data packet. Then, the base station records the read information (i.e., terminal identification and the number of the required idle slots) on a next position of the real-time data user who has most recently arrived at the global queue.

Thus, the base station may realize whether the non real-time data packet exists or not, based on the number of the slots that the global queue requires. If there is no allocated real-time traffic or data, the non real-time traffic or data can be allocated. The channel competition results of the non real-time traffic or data are broadcasted by using the acknowledge minipacket, in the same manner as described in the real-time traffic users.

The present invention has the following advantages.

(1) Separation of Channel Competition

Figure 7:
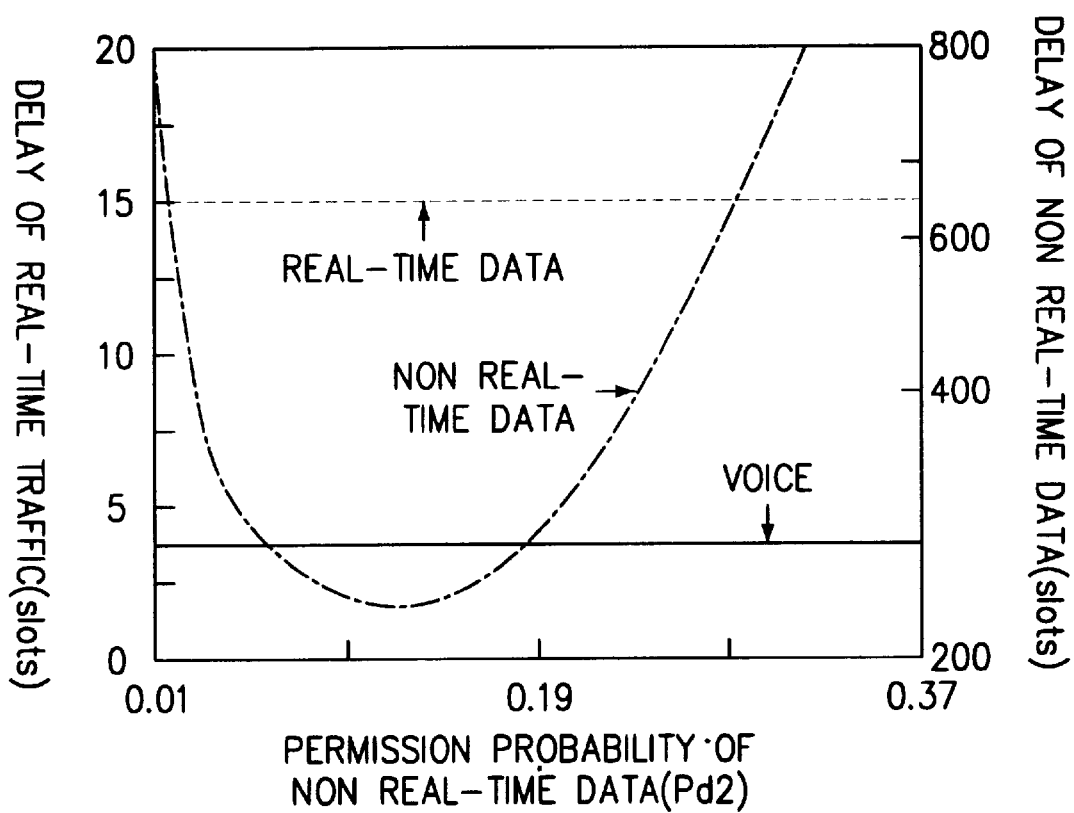
FIG. 7 is a graphical representation showing a delay characteristic curve of a permission probability of non real-time data versus the respective traffic users according to an embodiment of the present invention.

As illustrated in FIG. 7, the amount of the non real-time traffic or data has no influence on the quality of the real-time traffic or data, because the channel competition of the non real-time traffic happens after the channel competition process of the real-time traffic and the associated traffic allocation.

(2) Improved Performance on Imperfect Channel

Figure 8:
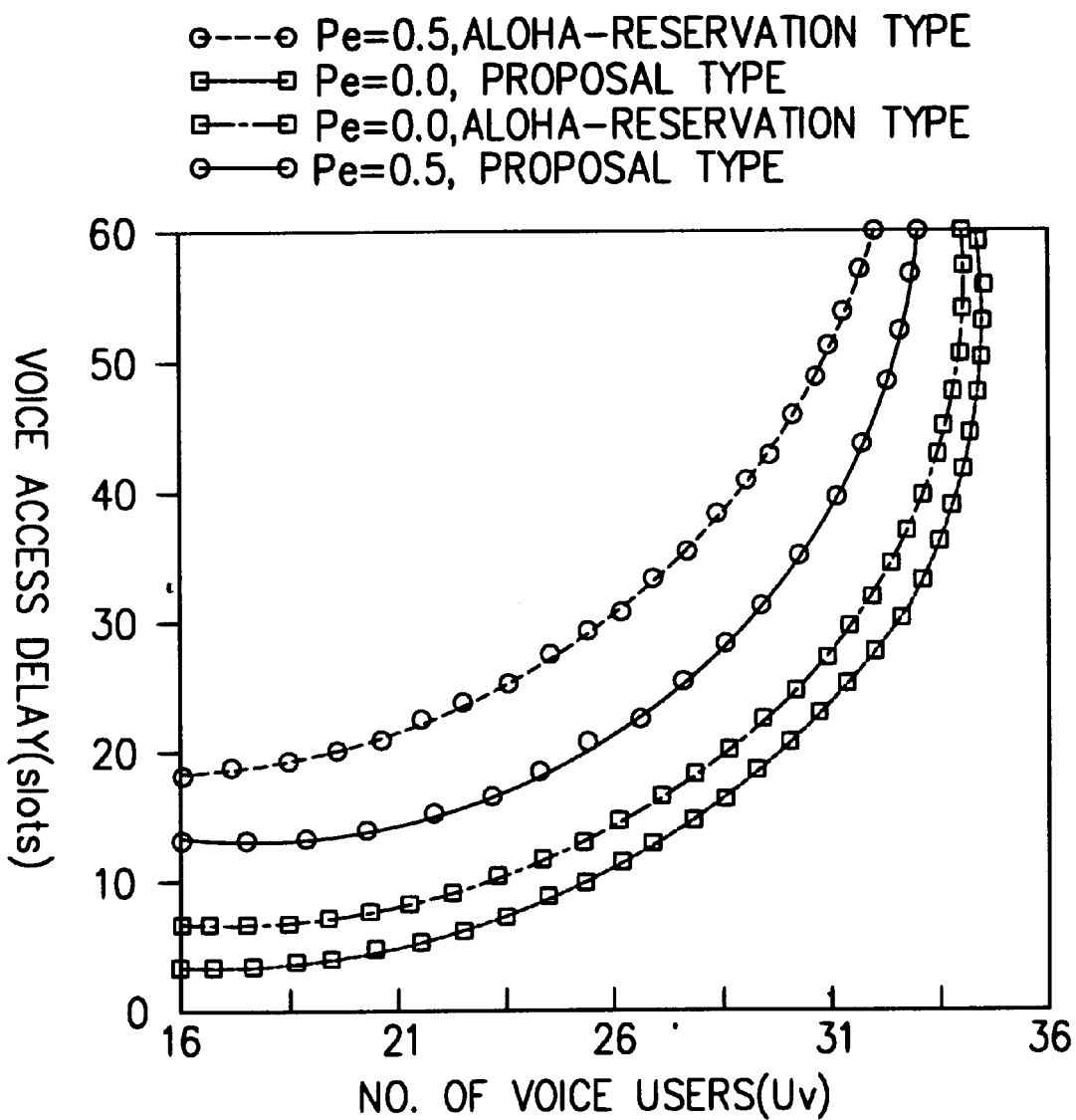
FIG. 8 is a graphical representation showing a characteristic curve of the number of voice users versus the voice access delay according to an embodiment of the present invention.

As illustrated in FIG. 8, on the assumption that the down-link channel does not have noise and the up-link has the error burst, if an error probability Pe of the up-link has a large value, the voice access delay will be reduced, compared with the case when the ALOHA-reservation protocol is applied. The reason is that the reservation minipacket can be retransmitted by the frame unit, when the channel competition fails due to the contention or the noise error in case of using the ALOHA-reservation protocol.

(3) The present invention has an excellent delay feature in case that the noise error is periodically generated, because the channel competition opportunity at all the slots means the reduction of a back-off time. Further, the proposed protocol may improve the quality of the real-time traffic when the non real-time traffic load is relatively large.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A method for forming a frame structure for use in a TDMA (Time Division Multiple Access) communication system, comprising the steps of:

preparing a plurality of slots on the frame;

disposing a plurality of acknowledge subslots for a down-link at a leading end of each of said slots;

determining whether generated real time traffic is voice or data;

evaluating a permission probability of the real traffic at a next request subslot;

determining whether successful reservation of a communication channel has been established;

reserving an idle slot when the real time traffic is voice and a successful reservation has been made;

allocating remaining idle slots to non-real-time traffic;

transmitting packets when the idle slot has been reserved;

determining whether the voice data has been completed; and returning the reserved idle slot to its idle status when the voice data is complete.

2. The method according to claim 1, further comprising the steps of:

buffering the successful reservation of the communication channel to a global data queue when the real time traffic is data;

determining the presence of an idle slot;

transmitting a real time data packet when an idle slot is present;

determining whether the transmitted data packet was the last packet;

transmitting a subsequent data packet when the transmitted data packet is not the last data packet;

terminating the data transmission when the transmitted data packet is the last packet.

3. The method according to claim 1, further comprising the step of:

delaying the frame on the down-link by a timing offset.

4. The method according to claim 3, wherein said timing offset is equal to half the duration of one of said plurality of slots.

5. A method for forming a frame structure for use in a time division multiple access (TDMA) communication system, comprising the steps of:

preparing a plurality of slots on the frame:

disposing a plurality of request subslots on an up-link at a leading end of each of said slots;

determining whether generated real-time traffic is voice or data;

evaluating a permission probability of a next request subslot, said permission probability based on whether the real-time traffic is voice or data;

determining whether successful reservation of a communication channel has been established;

waiting for a reserved idle slot when the real-time traffic is voice and a successful reservation has been made;

buffering to a global data queue when the real-time traffic is data and a successful reservation has been made;

transmitting a voice packet at the reserved idle slot in each frame, until the voice real-time traffic is completed;

transmitting a data packet from the global data queue when an idle slot is reached, until the data real-time traffic is completed;

allocating remaining idle slots to non-real-time traffic; and returning the reserved idle slot to its idle status when the voice data is completed.

6. The method according to claim 5, further comprising the step of:

delaying the frame on the down-link by a timing offset.

7. The method according to claim 6, wherein said timing offset is equal to half the duration of one of said plurality of slots.

8. A method for forming a frame structure for use in a time division multiple access (TDMA) communication system, comprising the steps of:

preparing a plurality of slots on the frame:

disposing a plurality of request subslots on an up-link at a leading end of each of said slots;

disposing a plurality of request subslots on a down-link at a leading end of each of said slots;

determining whether generated real-time traffic is voice or data;

evaluating a permission probability of a next request subslot, said permission probability based on whether the real-time traffic is voice or data;

determining whether successful reservation of a communication channel has been established;

waiting for a reserved idle slot when the real-time traffic is voice and a successful reservation has been made;

buffering to a global data queue when the real-time traffic is data and a successful reservation has been made;

transmitting a voice packet at the reserved idle slot in each frame, until the voice real-time traffic is completed;

transmitting a data packet from the global data queue when an idle slot is reached, until the data real-time traffic is completed;

allocating remaining idle slots to non-real-time traffic; and returning the reserved idle slot to its idle status when the voice data is completed.

9. The method according to claim 8, further comprising the step of:

delaying the frame on the down-link by a timing offset.

10. The method according to claim 9, wherein said timing offset is equal to half the duration of one of said plurality of slots.

* * * * *